(12) United States Patent
Conner

(10) Patent No.: US 8,905,103 B1
(45) Date of Patent: Dec. 9, 2014

(54) TOOL FOR FASTENING AN ATTACHMENT ELEMENT TO A SURFACE

(71) Applicant: Robert D. Conner, Panama City, FL (US)

(72) Inventor: Robert D. Conner, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 23 days.

(21) Appl. No.: 13/766,942

(22) Filed: Feb. 14, 2013

(51) Int. Cl.
*B32B 37/00* (2006.01)

(52) U.S. Cl.
CPC .................................. *B32B 37/0046* (2013.01)
USPC ........... 156/381; 156/350; 156/359; 156/358; 156/356; 156/349; 156/382; 156/351; 156/378; 156/285

(58) Field of Classification Search
CPC .... B32B 37/10; B32B 37/12; B32B 37/1009; B32B 37/1207; B32B 37/0046; B29C 65/7841; B29C 35/0288; B29C 65/4815; B29C 65/5057; B29C 65/52; B29C 65/542; B29C 65/7847; A01B 12/006
USPC ......... 156/350, 359, 358, 356, 349, 381, 382, 156/351, 378, 285, 60, 64, 538, 380.9, 156/379.8, 286
See application file for complete search history.

(56) References Cited

U.S. PATENT DOCUMENTS 3,253,972 A * 5/1966 Huddleston ................ 156/304.2

* cited by examiner

*Primary Examiner* — Margaret Squalls
(74) *Attorney, Agent, or Firm* — James T. Shepherd

(57) ABSTRACT

A tool defines a piston/cylinder with first and second chambers on either side of the piston. A sealable port couples the first chamber to ambient environment. One end of the tool (i) defines a volume that is open to ambient environment, and (ii) has a cartridge coupled thereto such that the volume remains open to ambient environment. The cartridge defines (i) a chamber filled with a meltable material, and (ii) a channel coupling the material-filled chamber to ambient environment. A melting device in thermal communication with the meltable material simultaneously heats an air/water mixture in the second chamber and melts the meltable material. An element releasably coupled to the tool spans a region within the cartridge that lies within the channel. The element incorporates a check valve separating the volume defined by the tool and ambient environment.

20 Claims, 3 Drawing Sheets

TOOL FOR FASTENING AN ATTACHMENT ELEMENT TO A SURFACE

ORIGIN OF THE INVENTION

The invention described herein may be manufactured and used by or for the Government of the United States of America for Governmental purposes without payment of any royalties.

FIELD OF THE INVENTION

The invention relates generally to tools, and more particularly to a tool for the fastening of an attachment element to a surface.

BACKGROUND OF THE INVENTION

Current industry and military methods of attaching elements to a surface under or above water are varied. Some of the most common methods of attachment include the use of adhesives, magnets, fasteners, stud guns, welding, and suction devices. However, each of these methods has limitations.

Adhesives are typically mixtures in the liquid or semi-liquid state that adhere or bond items together. Surfaces to be joined must be clean for the adhesive to bond. Usually, submerged objects are not clean and are difficult to clean properly while submerged. Therefore, adhesives are an impractical method for underwater attachments. Furthermore, most adhesives take 24 hours to fully cure thereby causing work delays. There are some two-part epoxies that can cure in as little as five minutes, but they require refrigerated storage and are more volatile. The quicker the curing time, the more reactive the ingredients thereby creating hazardous material concerns.

Magnets can provide extremely strong bonds. However, they only attach to ferrous materials. Thus, wooden, plastic, concrete, ceramic, and fiberglass objects are excluded from this attachment method.

Fasteners provide a mechanical means to attach two objects together with nails or screws. Above the water, this approach is fairly easy to implement with just a few tools, but can be time intensive. Using this method to attach objects underwater can be not only time intensive, but also nearly impossible. If the person trying to making the attachment is wearing diving gloves or if the water is very dirty or turbulent, it may not be possible to use this attachment method. Additionally, underwater power tools are limited to pneumatics and require topside air supplies.

Stud guns create strong attachment points on metal, wood and concrete, but have strict handling requirements because they generate projectiles. They also do not work well for plastic, fiberglass and ceramics which often split or shatter with the force of the projectile.

Suction devices can be used to attach objects on flat smooth surfaces like glass or rough surfaces like brick. Basic suction cups work well on smooth surfaces like glass; however, a continuous vacuum needs to be pulled when using suction devices on rough surfaces. Pulling a continuous vacuum requires a pump, hoses, and a power source. Further, all suction cups leak to some degree.

SUMMARY OF THE INVENTION

Accordingly, it is an object of the present invention to provide a tool that can attach an element to a surface.

Another object of the present invention is to provide a tool that can attach an element to a surface that is above the water or underwater.

Other objects and advantages of the present invention will become more obvious hereinafter in the specification and drawings.

In accordance with the present invention, a tool includes a housing assembly defining a ring-shaped cylinder and slidingly supporting a ring-shaped piston in the cylinder where a first chamber in the cylinder is defined on one side of the piston and a second chamber in the cylinder is defined on another side of the piston. The second chamber is filled with a mixture of water and air. The housing assembly further has a sealable port in fluid communication with the first chamber and an ambient environment. One end of the housing assembly (i) defines a volume that is open to the ambient environment, and has a ring-shaped cartridge assembly coupled thereto such that the volume remains open to the ambient environment. The cartridge assembly defines (i) a ring-shaped chamber filled with a material in a solid state thereof, and (ii) a ring-shaped channel in fluid communication the ring-shaped chamber and in fluid communication with the ambient environment. A melting device mounted in the cartridge assembly is in thermal communication with the second chamber in the housing assembly and the material in the solid state. The melting device simultaneously heats the mixture in the second chamber and transforms the material in the solid state to a liquid state with the material in the liquid state being flowable through the ring-shaped channel. An element is releasably coupled to the one end of the housing assembly and spans a region within the cartridge assembly that lies within the ring-shaped channel. The element incorporates a check valve in fluid communication with the volume defined by the housing assembly and the ambient environment.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
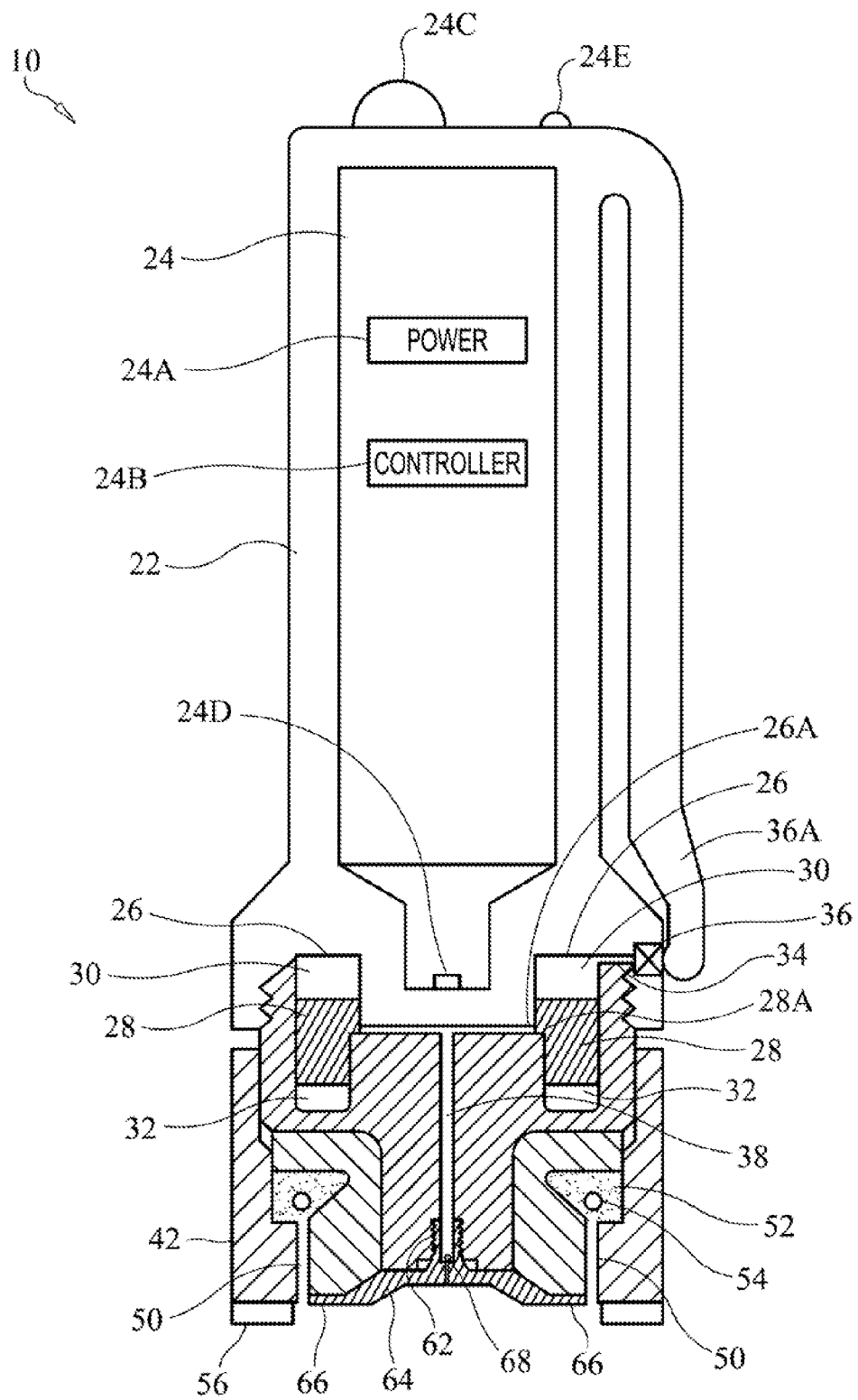
FIG. 1 is a part schematic, part cross-sectional view of an attachment tool in accordance with an embodiment of the present invention.
Figure 2:
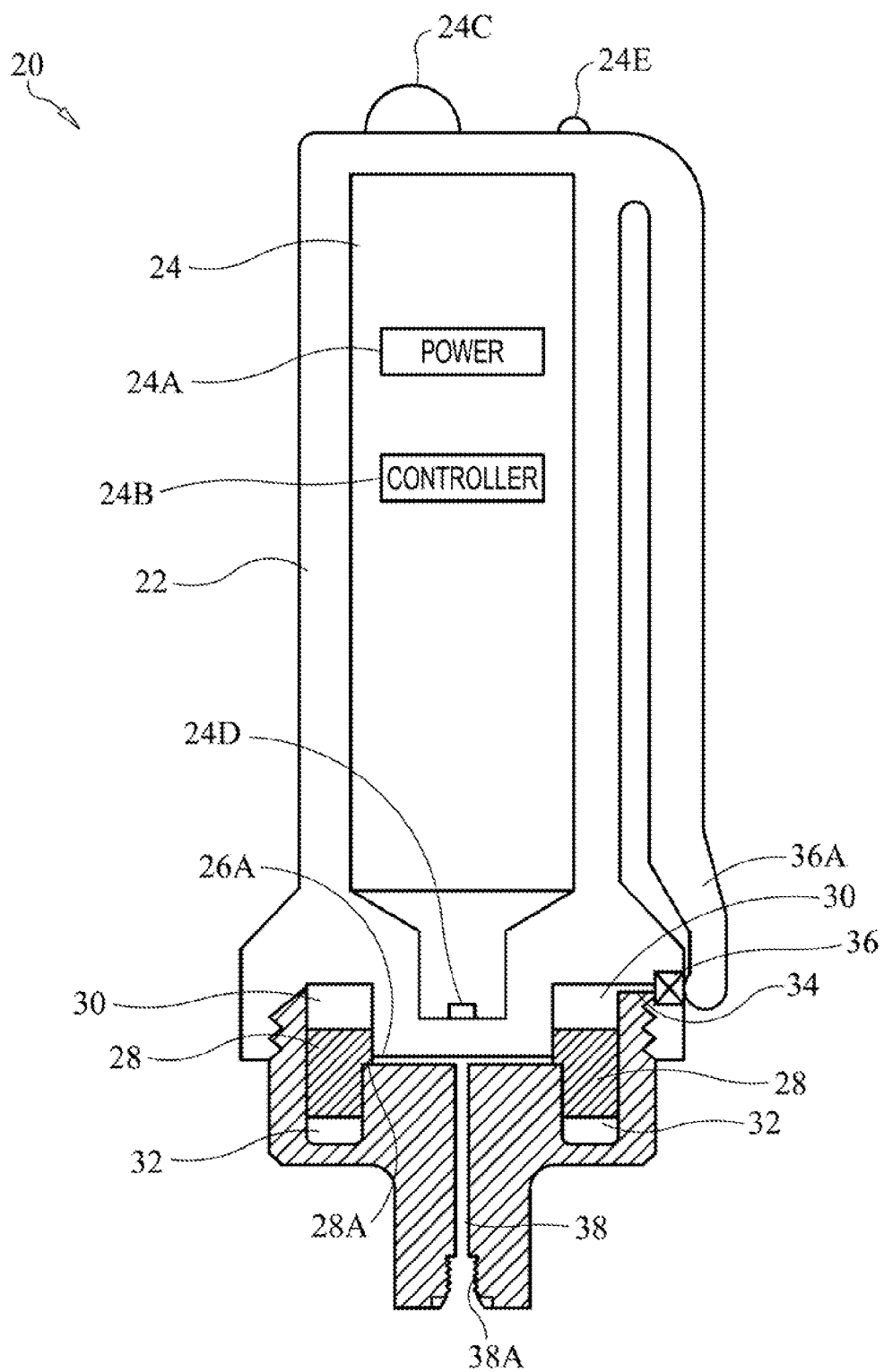
FIG. 2 is an isolated view of the housing assembly portion of the attachment tool.
Figure 3:
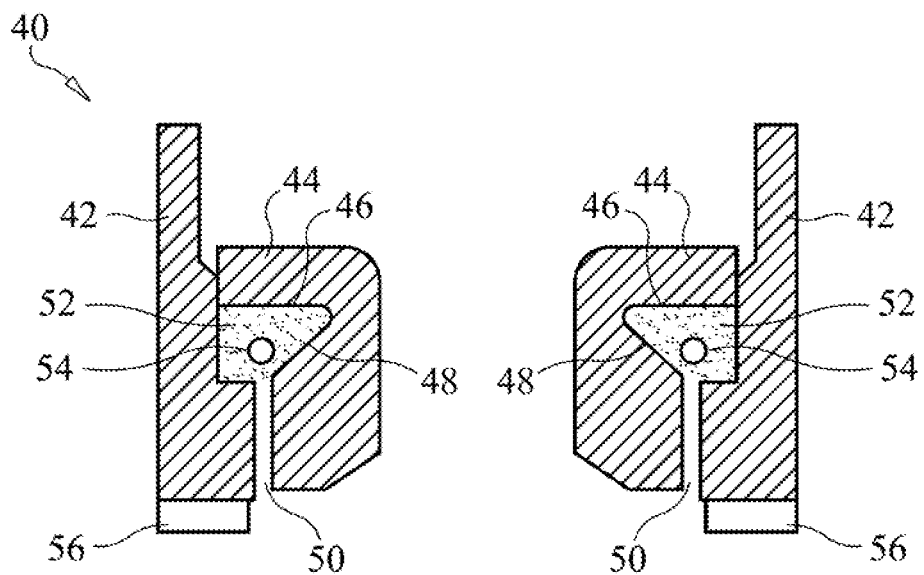
FIG. 3 is an isolated view of the cartridge assembly portion of the attachment tool.

Referring now to the drawings, simultaneous reference will be made to FIGS. 1-4 where an embodiment of an attachment tool 10 is shown fully assembled in FIG. 1. The constituent assemblies/parts of attachment tool 10 are shown in isolation in FIGS. 2-4 in order to facilitate a clear understanding of the present invention. Common reference numerals are used for elements that are common in the various views. In general, FIG. 2 illustrates a housing assembly 20 of tool 10, FIG. 3 illustrates a cartridge assembly 40 of tool 10, and FIG.

4 illustrates an element 60 separated from tool 10 after element 60 has been attached to a surface 100 (e.g., underwater or out of water) by tool 10.

Housing assembly 20 is generally a hand-held assembly having an outer case 22 that holds/protects electronics 24 to include a power source (e.g., battery or batteries) 24A, a controller 24B, an on/off control 24C accessible on the outside of case 22, a temperature sensor 24D, a temperature/ready light 24E, etc., the choice and construction of which are not limitations of the present invention. For clarity of illustration, connections between the constituent portions of electronics 24 and electronically controlling/controlled elements of tool 10 have been omitted.

Housing assembly 20 defines a ring-shaped cylinder 26 for the sliding support of a ring-shaped piston 28 with chambers 30 and 32 (in cylinder 26) being defined on either side of piston 28. Cylinder 26 and piston 28 can incorporate corresponding steps 26A and 28A to limit travel of piston 28. Chamber 30 is filled with air and chamber 32 is filled with a mixture of air and water. Chamber 30 is ported to the ambient environment by a port 34 sealed by a user-operated valve 36 (e.g., via an activation handle, switch, etc., 36A coupled to valve 36). A central outboard end of housing assembly 20 defines a volumetric region 38 open to the ambient environment. The outboard end of region 38 can be threaded at 38A for reasons that will be explained further below. The inboard portion of region 38 extends to cylinder 26 and is sealed by piston 28 when stops 26A and 28A are engaged with one another (FIG. 1).

Cartridge assembly 40 is a ring-shaped assembly (FIG. 3) sized/shaped to fit and be coupled to the one end of housing assembly 20 defining volumetric region 38 while maintaining exposure of region 38 to the ambient environment. Cartridge assembly 40 includes an outer casing 42 essentially defined as an open-ended cylinder for mating/coupling (e.g., via threaded engagement, snap-on quick release engagement, etc.) to the end of housing assembly 20 as shown in FIG. 1.

Fitted within casing 42 is another open-ended cylinder 44 that defines an annular notch 46 such that an annular chamber 48 is defined between casing 42 and open-ended cylinder 44, and such that an annular channel 50 is defined between casing 42 and cylinder 44. Annular channel 50 couples annular chamber 48 to the ambient environment. A meltable material 52 (e.g., wax, a thermoplastic, etc.) in its solid state is disposed in annular chamber 48. A heating element 54 (e.g., electrically activated in which case it is electrically coupled to electronics 24, chemically activated, etc.) is disposed in or in proximity to annular chamber 48 to be in thermal contact with meltable material 52. Portions of casing 42 and/or portions of cylinder 44 along with the portion of housing assembly 20 defining chamber 32 are generally made from material(s) that can transfer thermal energy for reasons that will be explained further below. A porous ring-shaped pad 56 (e.g., sponge material) is coupled to the outboard axial end of casing 42.

Element 60 is representative of any structure that is releasably coupled to cartridge assembly 40 and that can be attached to a surface 100 via the operation of tool 10. In the illustrated example, element 60 (FIG. 4) defines an externally-threaded stud 62 to which an object (not shown) can be attached. In terms of its inclusion in tool 10, threaded stud 62 is sized/shaped for threaded coupling to housing assembly 20 at the threaded portion 38A of region 38 (FIG. 1). Threaded stud 62 is integrated with and extends from an inverted cup-shaped portion 64 defining an annular foot 66 at its outermost edge that fits within the annular region defined by annular channel 50. Stud 62 is an open-ended hollow structure in fluid communication with region 33 when element 60 is incorporated in tool 10 as shown in FIG. 1. A one-way check valve 68 is fitted in the hollow structure of stud 62 such that check valve 68 "seals" region 38 from the ambient environment.

Figure 4:
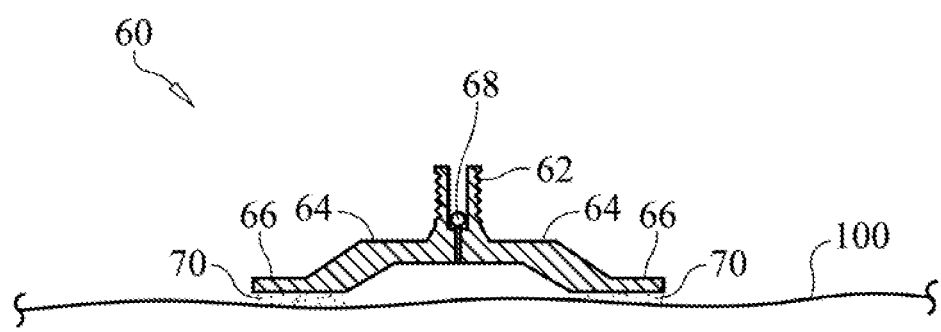
FIG. 4 is an isolated view of the element portion of the tool attached to a surface as performed by operation of the attachment tool.

In operation, tool 10 with element 60 coupled thereto is brought to a surface 100 to which element 60 is to be attached. For illustrative purposes, it will be assumed that surface 100 is underwater. A user activates heating element 54 via on/off switch 24C. Once heating element 54 heats material 52 to its liquid state (as detected by sensor 24D), temperature light 24E is lit to indicate that tool 10 is ready to attach element 60 to surface 100. Note that the heating of material 52 simultaneously heats the air/water mixture in chamber 32 (owing to thermal conduction provided by casing 42 and/or cylinder 44 and the portion of housing assembly surrounding chamber 32) thereby applying pressure to piston 28. At this point, the user places tool 10 on surface 100 such that ring-shaped pad 56 is in contact therewith. The user then opens valve 36 whereby the pressure being exerted on piston 28 in chamber 32 (by the heated mixture of water and air therein) will cause piston 28 to move into chamber 30. Movement of piston 28 creates a vacuum in region 38 that opens check valve 68. As a result, the ambient environment (e.g., water in the illustrated example) flows up through stud 62/region 38 to thereby create a vacuum between element 60 and surface 100. The vacuum between element 60 and surface 100 draws the heated liquid material 52 through annular channel 50 where it can flow underneath annular foot 66. Once under annular foot 66, heated and flowable material 52 re-solidifies in the cooler ambient environment to form an annular seal 70 (FIG. 4) between foot 66 and surface 100. Housing assembly 20 and cartridge assembly 40 are then simply unscrewed from element 60 leaving element 60 securely attached to surface 100 (FIG. 4).

The advantages of the present invention are numerous. Attachment elements are readily attached to any above-water or submerged surface using a simple hand-held tool. No surface penetrating holes are used. The tool can be used in limited access and/or low visibility environments. The tool is reusable thereby making its use efficient and cost effective.

Although the invention has been described relative to specific embodiments thereof, there are numerous variations and modifications that will be readily apparent to those skilled in the art in light of the above teachings. For example, the device used to heat/melt material 52 can utilize a chemical reaction, light energy, or any other means to heat/transform material 52 to a liquid/flowable state. It is therefore to be understood that, within the scope of the appended claims, the invention may be practiced other than as specifically described.

What is claimed as new and desired to be secured by Letters Patent of the United States is:

1. A tool, comprising:
   a housing assembly defining a ring-shaped cylinder and supporting a ring-shaped piston in said cylinder for sliding movement therein, wherein a first chamber in said cylinder is defined on one side of said piston and a second chamber in said cylinder is defined on another side of said piston and wherein said second chamber is filled with a mixture of water and air, said housing assembly further having a sealable port in fluid communication with said first chamber and adapted to be in fluid communication with an ambient environment, said housing assembly having one end thereof defining a volume open to the ambient environment;
   a ring-shaped cartridge assembly coupled to said one end of said housing assembly wherein said volume remains open to the ambient environment, said cartridge assembly defining (i) a ring-shaped chamber filled with a material in a solid state thereof, and (ii) a ring-shaped channel in fluid communication with said ring-shaped chamber and adapted to be in fluid communication with the ambient environment;

a melting device mounted in said cartridge assembly and in thermal communication with said second chamber in said housing assembly and said material in said solid state, said melting device simultaneously heating said mixture in said second chamber and transforming said material in said solid state to a liquid state wherein said material in said liquid state is flowable through said ring-shaped channel; and an element releasably coupled to said one end of said housing assembly and spanning a region within said cartridge assembly that lies within said ring-shaped channel, said element incorporating a check valve in fluid communication with said volume defined by said housing assembly and adapted to be in fluid communication with the ambient environment.

2. A tool as in claim 1, wherein said material is selected from the group consisting of wax and a thermoplastic.

3. A tool as in claim 1, wherein said melting device comprises:
 a heating element disposed in said ring-shaped chamber; and
 a controller mounted in said housing assembly and coupled to said heating element for raising a temperature of said heating element at a selected time.

4. A tool as in claim 3, further comprising a user-operated switch coupled to said controller for controlling occurrence of said selected time.

5. A tool as in claim 1, wherein said element defines a convex volume surrounding said check valve.

6. A tool as in claim 1, wherein said element is threadably coupled to said one end of said housing assembly.

7. A tool as in claim 1, further comprising a porous material coupled to an outboard annular region of said cartridge assembly.

8. A tool as in claim 7, wherein said porous material comprises a sponge material.

9. A tool as in claim 1, further comprising a sensor for detecting when said material is in said liquid state thereof.

10. A tool as in claim 9, further comprising an indicator coupled to said sensor for producing a discernable indication when said material is in said liquid state thereof.

11. A tool as in claim 1, further comprising a device coupled to said housing assembly for controlling the opening and closing of said sealable port.

12. A tool, comprising:
 a housing assembly defining a ring-shaped cylinder and supporting a ring-shaped piston in said cylinder for sliding movement therein wherein a first chamber in said cylinder is defined on one side of said piston and a second chamber in said cylinder is defined on another side of said piston and wherein said second chamber is filled with a mixture of water and air, said housing assembly further having a sealable port in fluid communication with said first chamber and adapted to be in fluid communication with an ambient environment, said housing assembly having one end thereof defining a volume open to the ambient environment;
 a device coupled to said housing assembly for controlling the opening and closing of said sealable port;
 a ring-shaped cartridge assembly coupled to said one end of said housing assembly wherein said volume remains open to the ambient environment, said cartridge assembly defining (i) a ring-shaped chamber filled with a material in a solid state thereof, and (ii) a ring-shaped channel in fluid communication with said ring-shaped chamber and adapted to be in fluid communication with the ambient environment;
 a heating element disposed in said ring-shaped chamber;
 a controller mounted in said housing assembly and coupled to said heating element for raising a temperature of said heating element at a selected time, wherein said heating element simultaneously transforms said material in said solid state to a liquid state and heats said mixture in said second chamber and wherein said material in said liquid state is flowable through said ring-shaped channel; and
 an attachment element releasably coupled to said one end of said housing assembly and spanning a region within said cartridge assembly that lies within said ring-shaped channel, said attachment element incorporating a check valve in fluid communication with said volume defined by said housing assembly and adapted to be in fluid communication with the ambient environment.

13. A tool as in claim 12, wherein said material is selected from the group consisting of wax and a thermoplastic.

14. A tool as in claim 12, further comprising a user-operated switch coupled to said controller for controlling occurrence of said selected time.

15. A tool as in claim 12, wherein said attachment element defines a convex volume surrounding said check valve.

16. A tool as in claim 12, wherein said attachment element is threadably coupled to said one end of said housing assembly.

17. A tool as in claim 12, further comprising a porous material coupled to an outboard annular region of said cartridge assembly.

18. A tool as in claim 17, wherein said porous material comprises a sponge material.

19. A tool as in claim 12, further comprising a sensor for detecting when said material is in said liquid state thereof.

20. A tool as in claim 19, further comprising an indicator coupled to said sensor for producing a discernable indication when said material is in said liquid state thereof.

* * * * *